(12) United States Patent
Kitamura et al.

(10) Patent No.: US 6,750,167 B2
(45) Date of Patent: Jun. 15, 2004

(54) CRYSTALLIZED GLASS

(75) Inventors: Naoyuki Kitamura, Ikeda (JP); Takahiro Matano, Otsu (JP); Akihiko Sakamoto, Otsu (JP)

(73) Assignees: National Institute of Advanced Industrial Science and Technology, Tokyo-to (JP); Nippon Electric Glass Co., LTD, Shiga-ken (JP)

( * ) Notice: Subject to any disclaimer, the term of this patent is extended or adjusted under 35 U.S.C. 154(b) by 8 days.

(21) Appl. No.: 10/188,295

(22) Filed: Jul. 1, 2002

(65) Prior Publication Data

US 2003/0054935 A1 Mar. 20, 2003

(30) Foreign Application Priority Data

Jul. 4, 2001 (JP) ........................................ 2001-203948

(51) Int. Cl.⁷ ........................... C03C 10/12; C03C 10/14
(52) U.S. Cl. ................................................ 501/4; 501/7
(58) Field of Search ......................................... 501/4, 7

(56) References Cited

U.S. PATENT DOCUMENTS

| | | | | | |
|---|---|---|---|---|---|
| 5,173,453 | A | * | 12/1992 | Beall et al. ..................... | 501/4 |
| 6,170,995 | B1 | * | 1/2001 | Mitachi et al. ................ | 385/78 |
| 6,400,884 | B1 | * | 6/2002 | Matano et al. ............... | 385/137 |
| 6,492,288 | B2 | * | 12/2002 | Shindo .......................... | 501/4 |
| 6,506,699 | B1 | * | 1/2003 | Shindo et al. ................. | 501/7 |
| 6,521,556 | B2 | * | 2/2003 | Shindo et al. ................. | 501/4 |
| 6,689,704 | B2 | * | 2/2004 | Ota et al. ...................... | 501/7 |

\* cited by examiner

*Primary Examiner*—Karl Group
(74) *Attorney, Agent, or Firm*—J.C. Patents

(57) ABSTRACT

A crystallized glass is provided. A β-quartz solid solution or a β-eucryptite solid solution is precipitated as a main crystal. The crystallized glass has a crystallization degree not less than 70 mass %, a crystal grain size not more than 0.5 µm, substantially no gap or crack occurring at boundaries of crystal grains. The crystallized glass also has a thermal expansion coefficient being negatively greater than $-10 \times 10^{-7}/°C$. within a temperature range of $-40°C. \sim 100°C.$, a hysteresis of the thermal expansion coefficient within the temperature range being not more than 10 ppm, and a temperature dependence of the refractive index being not more than $13 \times 10^{-6}/°C$.

10 Claims, 2 Drawing Sheets

CRYSTALLIZED GLASS

CROSS-REFERENCE TO RELATED APPLICATION

This application claims the priority benefit of Japanese application serial no. 2001-203948, filed on Jul. 4, 2001.

BACKGROUND OF THE INVENTION

1. Field of the Invention

This invention relates in general to a crystallized glass in which a β-quartz solid solution or a β-eucryptite solid solution has been precipitated as a main crystal. More particularly, the invention relates to a crystallized glass, which is suitable for serving as a temperature compensating substrate material for various devices or a waveguide layer material for waveguide devices in the field of optical communication.

2. Description of Related Art

The crystallized glass with a thermal expansion coefficient of about zero, in which a β-quartz solid solution or a β-eucryptite solid solution was precipitated to serve as a main crystal is well known. Initially, it is used as window glass for stoves or fire-proof glass for architecture, and now has a variety of applications.

As the optical communication technology has become highly developed in recent years, the network using the optical fiber is in the process of being furnished promptly. In such a network, a wave multiplexing technology is used for transmitting lights with plural wavelengths in a lump, so that the wavelength filter, the optical coupler, and the waveguide etc have become important devices.

The characteristic of some of the above optical communication devices varies with the temperature, keeping away such devices from being used outdoors. Therefore, a temperature compensation technology has to be developed, i.e., a technology such that the characteristic of the optical communication device can be maintained independent of the temperature variation. A typical optical communication device requiring temperature compensation is a waveguide device, such as an arrayed waveguide (AWG) or a plane light circuit (PLC), or a fiber bragg grating (FBG).

Referring to FIG. 1, the waveguide device 1, such as the AWG or the PLC, has a waveguide layer 3 on a plane substrate 2 and a core 4 is formed within the waveguide layer 3. The waveguide device 1 can split, combine or switch the light. As shown in following equation (1), as the environmental temperature is changed, it causes a problem such that the optical path length is changed due to the variations of the refractive index and the thermal expansion coefficient. In the equation (1), S is the optical path length, n is the refractive index of the core 4, and α is the thermal expansion coefficient.

$$dS/dT = (dn/dT) + n\alpha \tag{1}$$

In addition, regarding light-transmittable material such as glass or crystal, the temperature dependence of the refractive index becomes larger as the thermal expansion coefficient becomes negatively greater. Therefore, if the glass is used as the waveguide layer, the temperature dependence of the device cannot be decreased if the thermal expansion coefficient is negatively increased. In other words, regarding the waveguide layer material for the AWG or the PLC, the refractive index variation due to the temperature variation causes a variation of the optical path length, so that the device characteristic changes.

The FBG is a device provided with a portion in which refractive index changes are given in the core of the optical fiber in grating-like, in other wards, the so-called grating portion. The FBG has the characteristic such that it reflects the light having a specific wavelength. As shown in the equation (2), the reflection wavelength will change because the refractive index and the grating spacing change. In the equation (2), λ is the wavelength of the reflecting light, n is the effective refractive index of the core 4, Λ is grating spacing of the portion whose refractive index changes in grating-like.

$$\partial \lambda / \partial T = 2\{(\partial n + \partial T) \cdot \Lambda + n(\partial \Lambda / \partial T)\} \tag{2}$$
$$= 2 \cdot \Lambda \{(\partial n / \partial T) + n(\partial \Lambda / \partial T)/\Lambda\}$$

To prevent the variation of the device characteristic, such methods are provided, as applying stress according to the temperature variation against the device to cancel fluctuating factors due to the variation of refractive index, or adjusting the refractive index itself.

The examples for the waveguide device such as the AWG or PLC etc are described at 2000 Communications of the Singaku Electronics Society C-13-21 or C-3-13. Stress applying pin is arranged in the device, or divided aluminum substrate is used to apply stress to the device according to the temperature variation, so that the refractive index of the waveguide can be adjusted.

An example for the FBG is provided. Alloy or quartz glass etc with a small thermal expansion coefficient and a metal (such as aluminum) with a large thermal expansion coefficient is combined as a temperature compensation material, and the temperature compensation material is fixed to the FBG. As shown in FIG. 3, aluminum brackets 11a, 11b with a relatively large thermal expansion coefficient are respectively attached to the both ends of an inver (trade mark) rod 10 with a small thermal expansion coefficient, the FBG 13 is extended to fix with a preset stress by using the clasps 12a, 12b to the aluminum brackets 11a, 11b. At this time, the grading portion 13a of the FBG 13 is wound between the two clasps 12a, 12b.

Under the above condition, as the environmental temperature increases, the aluminum brackets 11a, 11b extend to reduce the distance between the two clasps 12a, 12b, so that the stress applied to the grating portion 13a of the FBG 13 should be decreased. As the temperature decreases, the aluminum brackets 11a, 11b contract to increase the distance between the two clasps 12a, 12b, so that the stress applied to the grating portion 13a of the FBG 13 should be increased. In this way, by varying the stress acting on the FBG based on the temperature variation, the grating spacing of the grating portion can be adjusted, so that the temperature dependence of the central wavelength of the reflection light can be reduced.

However, because the above temperature compensation device is very complicated in structure, the manufacturing is very difficult and the installation is also very difficult.

In order to solve the above problem for the FBG, as shown in FIG. 2, WO97/28480 teaches a solution. In the solution, a glass preform previously formed in a plate shape is performed in thermal process, so that the β-quartz solid solution is precipitated therein to form a crystallized glass 14 with a negative thermal expansion coefficient. The FBG 16 is fixed by the adhesive 17 onto the crystallized glass 14 under a stress applying thereto with a weight 15. The stress is controlled by the expansion or the contraction of the crystallized glass 14. This method can be applied to any waveguide device. In addition, the item 16a is the grating portion of the FBG 16.

The thermal expansion coefficient of the crystallized glass disclosed in WO97/28480 is negatively large. In addition, because temperature compensation is performed by a single element, the device structure can be simply made. Because plural gaps or cracks are intended to form at the crystal grain boundary, there is a problem that the hysteresis of the thermal expansion is large.

The hysteresis of the thermal expansion is that when the material expands or contracts due to the temperature variation, the behavior when the temperature increases and the behavior when the temperature decreases are inconsistent. Even though a material having a large hysteresis of the thermal expansion is used as a temperature compensation material, the temperature dependence of the device cannot be correctly compensated.

Additionally, in the WO97/28480, to reduce the hysteresis of the thermal expansion of the crystallized glass, a thermal process is repeatedly performed at a temperature range of 400~800° C. However, this thermal process will reduce the productivity and the cost will be increased.

SUMMARY OF THE INVENTION

According to the foregoing description, an object of this invention is to provide a crystallized glass, wherein the crystallized glass has a negative thermal expansion coefficient required for compensating the temperature, the hysteresis of the thermal expansion is small, and the manufacturing cost can be reduced.

According to the object(s) mentioned above, the invention provides a crystallized glass. A β-quartz solid solution or a β-eucryptite solid solution is precipitated as a main crystal. The crystallized glass has a crystallinity not less than 70 mass %, a crystal grain size not more than 0.5 μm, substantially no gap or crack occurs at boundaries of crystal grains. The crystallized glass also has a thermal expansion coefficient being negatively greater than $-10 \times 10^{-7}/°$ C. within a temperature range of $-40°$ C.~$100°$ C., a hysteresis of the thermal expansion coefficient within the temperature range being not more than 10 ppm, and a temperature dependence of refractive index dn/dT being not more than $13 \times 10^{-6}/°$ C.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

Figure 1:
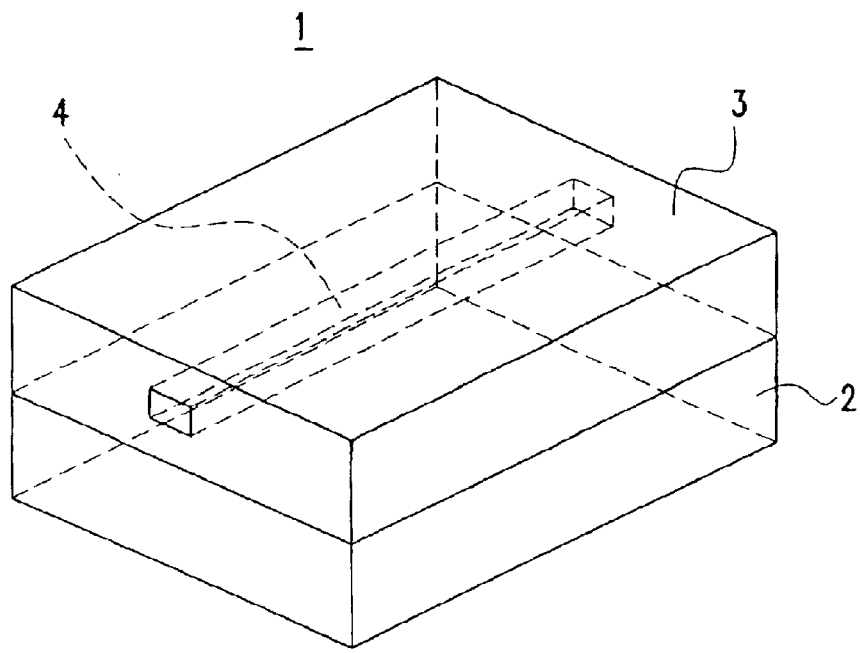
FIG. 1 is a perspective view showing a waveguide device.
Figure 2:
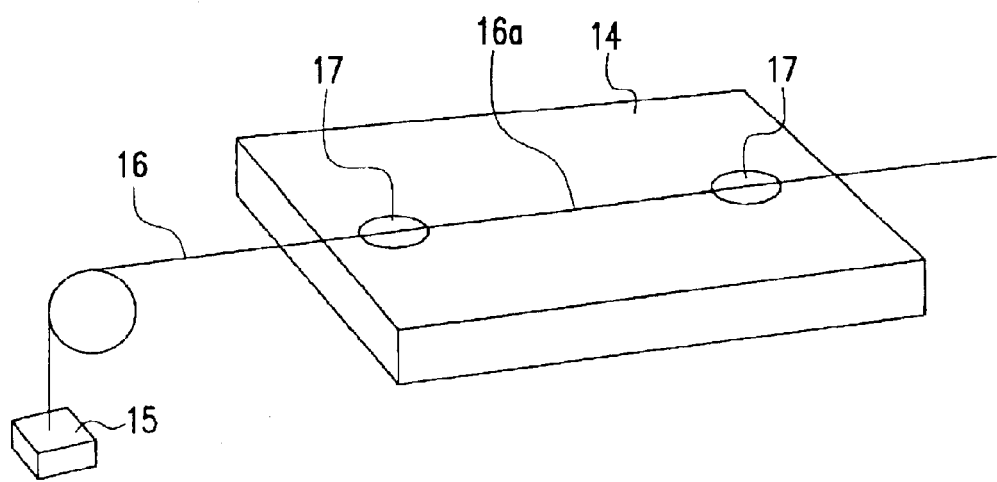
FIG. 2 is a perspective view showing a crystallized glass with a negative thermal expansion coefficient, which is fixed on the surface of a FBG.
Figure 3:
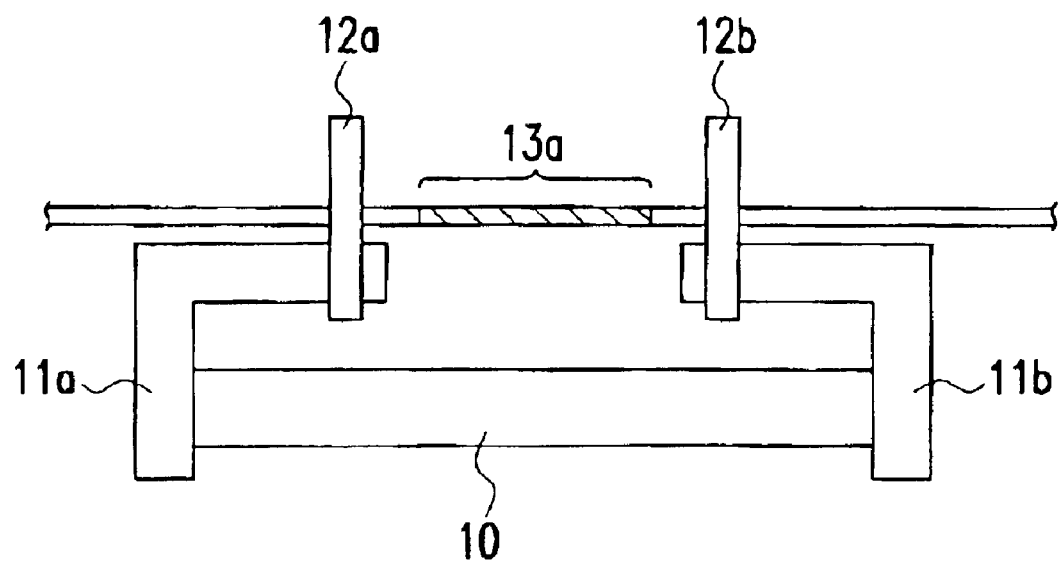
FIG. 3 is a front view showing a conventional device for preventing the variation of the reflecting wavelength of the FBG with respect to the temperature variation.

In order to understand the features of the invention, general principles for obtaining a crystallized glass wherein a β-quartz solid solution or a β-eucryptite solid solution is precipitated to have a large negative thermal expansion coefficient is explained in detail.

Substantially, there are two principles. As for the first principle, a crystal with an anisotropic thermal expansion is precipitated. By creating plural gaps or cracks at the crystal grain boundary, the contribution of the positive thermal expansion is reduced and the contribution of the negative thermal expansion is increased, so that the entire crystallized glass has a negative thermal expansion. In this situation, a gap or crack between the crystal grain boundary is formed due to the thermal stress acting on the grain boundary. If the crystal grain size is not large enough, no sufficient thermal stress will occur, and therefore the gap or crack will not occur and it is impossible to obtain a large negative thermal expansion coefficient. According to the first principle, the crystal grain size has to be not less than 1 μm in order to obtain a sufficient negative thermal expansion coefficient. According to this principle, in the process that the temperature increases or decreases, because a tiny gap or crack recombines or redissociates, hysteresis occurs in the thermal expansion behavior. The crystallized glass disclosed in WO97/28480 is based on the first principle.

Next, the second principle is discussed in detail. A lot of crystals having a negative thermal expansion coefficient are precipitated in the glass matrix, and the thermal expansion behavior of the crystal is reflected to the entire material. Because this kind of crystallized glass does not require a gap or crack to be formed at the crystal grain boundary, the hysteresis of the thermal expansion is extremely small. However, in order to overcome the positive thermal expansion of the glass matrix so that the entire material has a negative thermal expansion, the ratio of the crystal content, i.e., the crystallinity has to be increased. In order to increase the crystallinity of the crystallized glass, one possible method is to increase the thermal processing temperature (the crystallization temperature) during crystallization. However, when the temperature of the β-quartz solid solution or the β-eucryptite solid solution exceeds a certain temperature, it will be transformed to the β-spodumene solid solution having a positive thermal expansion coefficient. Therefore, even though the crystallization is performed at a high temperature to increase the crystallinity, a crystallized glass with a large negative thermal expansion coefficient cannot be obtained.

Based on the second principle, the inventors studied crystallinity or the transformation temperature of the crystal of a crystallized glass repeatedly. By adjusting the glass compositions, the crystallization temperature, or the pressure during crystallization to control the crystal grain size to be under a certain value, the transformation from the β-quartz solid solution or the β-eucryptite solid solution into the β-spodumene solid solution can be avoided.

In order to perform the temperature compensation for various optical communication devices, materials with a thermal expansion coefficient negatively greater than $-10 \times 10^{-7}/°$ C. are required. In order to use crystallized glass to obtain such materials, a β-quartz solid solution or a β-eucryptite solid solution, serving as a main crystal, is precipitated and its crystallinity has to be not less than 70 mass % (preferable is not less than 75 mass %, more preferable is not less than 80 mass %). In addition, if the crystal grain size in the crystallized glass is not more than controlled 0.5 μm (preferable is not more than 0.2 μm), the transformation temperature into the β-spodumene solid solution can be increased. Therefore, even though the thermal process is performed at a higher crystallization temperature, the crystal structure of the β-quartz solid solution or the β-eucryptite solid solution can be maintained, so that the crystallinity not less than 70 mass % can be obtained. Furthermore, as the crystal grain size is not more than 0.5 μm, the reason that transformation temperature into the β-spodumene solid solution can be increased is not very sure. However, one can deduce that the rearrangement of the atoms, which form the crystal, at the crystal grain boundary does not easily occur if the crystal grain size is smaller.

The crystal grain size of the crystallized glass of the invention is not more than 0.5 μm, and the thermal stress acting on the crystal grain boundary will reduce, so that no gaps or cracks substantially occurs at the crystal grain boundary. Therefore, the hysteresis of the thermal expansion at the range of −40° C.~100° C. can be controlled not more than 10 ppm.

Because the crystal grain size of the crystallized glass of the invention is not more than 0.5 μm, the crystal glass is light transmittable. For example, when the thickness of the crystallized glass is 3 mm and light with a wavelength between 400 nm and 1700 nm is used, the light transmittance is not less than 20%. This is preferred because the adhesion condition can be confirmed when adhering resin is used to assemble the device. If the light transmittance is high, the light transmittance in the ultraviolet region is also high, so that the ultraviolet curing resin can be used to assemble the device. Therefore, the higher light transmittance is better, preferably not less than 30%.

Because when the thickness of the crystallized glass is 3 mm and light with a wavelength between 400 nm and 1700 nm is used, the light transmittance is not less than 20%, the crystallized glass is suitable for the waveguide layer material for the AWG or the PLC etc that utilizes the above optical property. In this situation, the temperature dependence of the optical path length (dS/dT) not more than $10 \times 10^6/°$ C. is better, preferably not more than $5 \times 10^6/°$ C. Light transmittable material, whose temperature dependence of the optical path length (dS/dT) is small, is demanded, because optical devices with constant optical path length tend to be more important in recent years. As the temperature dependence of the optical path length (dS/dT) is $10 \times 10^6/°$ C. or below, the device characteristic is stable even though under a temperature varying environment.

Next, the temperature dependence of the optical path length is described in detail. Conventionally, regarding the structure of the laser oscillator etc, the optical path length other than the light transmittable portion also contributes to the device characteristic. The temperature dependence of the optical path length of the device can be expressed as the following equation (3).

$$dS/dT = (dn/dT)|(n-1)\alpha \quad (3)$$

In the equation (3), n is the refractive index, dn/dT is the temperature dependence of the refractive index, and α is the thermal expansion coefficient. According to the equation (3), the contribution of the thermal expansion coefficient is small. Therefore, it is possible to reduce dS/dT by means of an amorphous glass with a positively great thermal expansion coefficient and a negative dn/dT.

Regarding the optical device of the invention, the optical path length in only the waveguide layer material that is light transmittable becomes a problem. The temperature dependence of the optical path length of the device, as described above, can be expressed by the equation (1). In the equation (1), the thermal expansion coefficient has a larger influence on dS/dT than that in the equation (3). Therefore, if a material, like the conventional amorphous glass with a large positive thermal expansion coefficient, is used, it is very difficult to reduce dS/dT.

However, according to the invention, because the crystallized glass has a negative thermal expansion coefficient, and dn/dT is not more than $13 \times 10^{-6}/°$ C., dS/dT is easily not more than $10 \times 10^{-6}/°$ C.

Preferably, in unit of mass %, the crystallized glass contains 60~72% of $SiO_2$, 18~26% of $Al_2O_3$, 3.8~6.5% of $Li_2O$, 1.5~4.1% of $ZrO_2$, and 0~10% of $P_2O_5$. The reason is discussed as follows.

$SiO_2$ is the main component constituting of networks of the glass and a main component of the precipitated crystal. If the amount of $SiO_2$ is less than 60%, the glass becomes unstable, and it is very difficult to precipitated the β-quartz solid solution or the β-eucryptite solid solution as the main crystal with a required crystal grain size. On the other hand, if the amount of $SiO_2$ is more than 72%, the glass is difficult to melt. The preferable amount of $SiO_2$ is 62~70%, more preferably 63~69%.

$Al_2O_3$ is also the main component constituting of networks of the glass and a main component of the precipitated crystal. If the amount of $Al_2O_3$ is less than 18%, the desired crystal is not easily precipitated. On the other hand, if the amount of $Al_2O_3$ is more than 26%, the glass is easily devitrified. The preferable amount of $Al_2O_3$ is 20~24%, more preferably 20.5~23%.

$Li_2O$ is a component constituting of β-quartz solid solution or the β-eucryptite solid solution. If the amount of $Li_2O$ is less than 3.8%, it is difficult to have a crystallinity not less than 70%. On the other hand, if the amount of $Li_2O$ is more than 6.5%, the glass is easily devitrified and to control the crystal grain size not more than 0.5 μm is difficult. The preferable amount of $Li_2O$ is 4~6%, more preferably 4.2~5.7%.

$ZrO_2$ is a component serving for the formation of the crystal nucleus of a glass. If the amount of $ZrO_2$ is less than 1.5%, the nucleation is insufficient and the crystal having the desired grain size cannot be uniformly precipitated. On the other hand, if the amount of $ZrO_2$ is more than 4.1%, the glass is difficult to melt and the devitrification occurs easily, which is not preferred. The preferable amount of $ZrO_2$ is 1.8~3.8%, more preferably 2~3.5%.

$P_2O_5$ is a component serving for the acceleration of the nucleation and is capable of reducing the temperature dependence of the refractive index dn/dT. Therefore, the temperature dependence of the optical path length dS/dT can be reduced. If the amount of $P_2O_5$ is more than 10%, the viscosity of the glass increases, so that the glass is difficult to melt. The preferable amount of $P_2O_5$ is 0~1.5%, more preferably 0~3.5%.

In addition, according to the invention, if required, other components, such as $TiO_2$, $As_2O_3$, $B_2O_3$, $SnO_2$, MgO, $Na_2O$, $K_2O$, BaO, ZnO, $Sb_2O_3$, CaO, SrO etc can be also added. For example, the amount of $B_2O_3$ can be added to 8% to increase the meltability. However, when adding $TiO_2$ and As2O3, their adding amount should be controlled not more than 1%.

$TiO_2$ is generally used as a component for the nucleation and can accelerate the transformation from the β-quartz solid solution or the β-eucryptite solid solution into the β-spodumene solid solution. Therefore, as the amount of $TiO_2$ is more than 1%, the β-spodumene solid solution is easily precipitated and it is difficult to have a negative thermal expansion coefficient not more than $-10 \times 10^{-7}/°$ C. Furthermore, the light transmittance at short wave range is reduced. Therefore, the preferable amount of $TiO_2$ is not more than 0.8%, more preferably, the amount of $TiO_2$ should be suppressed not more than 0.7%.

In general, $As_2O_3$ is used as a fining agent for glass, but similar to $TiO_2$, it can also increase the transformation of crystal. Therefore, as the amount of $As_2O_3$ is more than 1%, the β-spodumene solid solution is easily precipitated, the crystallinity not less than 70 mass % is very difficult, and a negative thermal expansion coefficient not more than −10× $10^{-7}$/° C. is difficult to obtain. As a result, it is preferable that the amount of $As_2O_3$ is not more than 0.8%, more preferably, the amount of $As_2O_3$ should be suppressed not more than 0.6%.

As described above, the amount of $As_2O_3$ should be suppressed as possible, but $SnO_2$ can be added to 5% to compensate the reduction of fining. Namely, $SnO_2$, similar to $As_2O_3$, can fine the glass, but almost has no effect to increase the transformation of crystal. Furthermore, $SnO_2$ also serves for the nucleation ability.

According to the invention, it is preferable to perform a thermal process to the crystallizable glass at a crystallization temperature of 820° C.~1000° C. Namely, if the crystallization temperature is less than 820° C., it is hard to precipitate the β-quartz solid solution or the β-eucryptite solid solution as the main crystal to make a crystallinity in not less than 70 mass %. If the crystallization temperature is more than 1000° C., the crystallizable glass is easily transformed to a β-spodumene solid solution.

The crystallinity also depends on the atmosphere pressure during the crystallization. As the pressure is increased, the crystallinity can be increased. Therefore, if the pressure becomes higher, the preset crystallinity can be achieved at a lower temperature. To achieve such effect, the pressure has to be at least $5\times10^7$ Pa (500 atm).

In tables I and II, the crystallized glass according to the embodiments of the present invention are shown as EXAMPLES labeled sample numbers 1–9, while the crystallized glass according to the comparisons are shown as COMPARISON labeled sample numbers 10–12.

TABLE I

| Sample No. | EXAMPLES | | | | | |
|---|---|---|---|---|---|---|
| composition (mass %) | 1 | 2 | 3 | 4 | 5 | 6 |
| $SiO_2$ | 68.4 | 68.4 | 65.9 | 61.9 | 61.9 | 67.3 |
| $Al_2O_3$ | 22.1 | 22.1 | 22.7 | 20.7 | 20.7 | 22.8 |
| $Li_2O$ | 4.2 | 4.2 | 4.8 | 5.5 | 5.5 | 4.8 |
| $ZrO_2$ | 2.3 | 2.3 | 2.4 | 2.4 | 2.4 | 2.4 |
| $P_2O_5$ | 1.4 | 1.4 | 2.9 | 2.9 | 2.9 | 1.4 |
| $TiO_2$ | 0.5 | 0.5 | — | 1.3 | 1.3 | — |
| $As_2O_3$ | 0.3 | 0.3 | — | — | — | — |
| $SnO_2$ | — | — | 1.3 | 1.3 | 1.3 | 1.3 |
| MgO | 0.5 | 0.5 | — | — | — | — |
| $Na_2O$ | 0.2 | 0.2 | — | — | — | — |
| $K_2O$ | 0.1 | 0.1 | — | — | — | — |
| $B_2O_3$ | — | — | — | 4.0 | 4.0 | — |
| crystallization temperature (° C.) | 880 | 880 | 900 | 850 | 830 | 880 |
| Pressure ($\times10^5$ Pa) | 1 | 1500 | 1 | 1 | 1500 | 1 |
| transformation into β-spodumene solid solution | No | No | No | No | No | No |
| crystal grain size (μm) | 0.05 | 0.05 | 0.08 | 0.10 | 0.10 | 0.05 |
| gap or crack at the grain boundary | No | No | No | No | No | No |
| crystallinity (mass %) | 77 | 83 | 72 | 72 | 72 | 80 |
| thermal expansion coefficient ($\times10^7$/° C.) [−40~100° C.] | −16 | −17 | −17 | −12 | −12 | −20 |
| hysteresis (ppm) | 0 | 1 | 2 | 2 | 2 | 2 |
| Light transmittance (%) [400 nm, 3 mm] | 88 | 80 | 50 | 35 | 35 | 60 |
| temperature dependence of refractive index ($\times10^6$/° C.) | 5.5 | 5.0 | 12.0 | 10.5 | 10.5 | 4.5 |
| temperature dependence of optical path length ($\times10^6$/° C.) | 3.0 | 2.5 | 9.0 | 8.7 | 8.7 | 1.5 |

TABLE II

| Sample No. | EXAMPLES | | | COMPARISONS | | |
|---|---|---|---|---|---|---|
| composition (mass %) | 7 | 8 | 9 | 10 | 11 | 12 |
| $SiO_2$ | 67.3 | 66.3 | 66.3 | 69.4 | 66.5 | 46.2 |
| $Al_2O_3$ | 22.8 | 21.8 | 21.8 | 22.1 | 22.1 | 40.9 |
| $Li_2O$ | 4.8 | 5.5 | 5.5 | 4.2 | 4.2 | 9.1 |
| $ZrO_2$ | 2.4 | 2.9 | 2.9 | — | 2.4 | 1.8 |
| $P_2O_5$ | 1.4 | 2.5 | 2.5 | 1.3 | 1.3 | — |
| $TiO_2$ | — | 0.5 | 0.5 | — | 2.1 | 2.0 |
| $As_2O_3$ | — | — | — | 1.2 | 1.4 | — |
| $SnO_2$ | 1.3 | 0.5 | 0.5 | 1.3 | — | — |
| MgO | — | — | — | 0.5 | — | — |
| $Na_2O$ | — | — | — | — | — | — |

TABLE II-continued

| Sample No. | EXAMPLES | | | COMPARISONS | | |
|---|---|---|---|---|---|---|
| composition (mass %) | 7 | 8 | 9 | 10 | 11 | 12 |
| $K_2O$ | — | — | — | — | — | — |
| $B_2O_3$ | — | — | — | — | — | — |
| Crystallization temperature (° C.) | 925 | 880 | 925 | 925 | 925 | 1280 |
| Pressure($\times 10^5$ Pa) | 1 | 1 | 1 | 1 | 1 | 1 |
| transformation into β-spodumene solid solution | No | No | No | Yes | Yes | No |
| crystal grain size (μm) | 0.08 | 0.10 | 0.12 | 1.20 | 1.00 | 1.50 |
| gap or crack at the grain boundary | No | No | No | No | No | Yes |
| crystallinity (mass %) | 90 | 88 | 93 | 90 | 90 | 95 |
| thermal expansion coefficient ($\times 10^{-7}$/° C.) [−40~100° C.] | −25 | −28 | −33 | 8 | 5 | −40 |
| hyteresis (ppm) | 2 | 2 | 2 | 2 | 2 | 60 |
| Light transmittance (%) [400 nm, 3 mm] | 55 | 70 | 65 | 0 | 0 | 0 |
| temperature dependence of refractive index ($\times 10^6$/° C.) | 4.0 | 5.0 | 5.0 | NA | NA | NA |
| temperature dependence of optical path length($\times 10^6$/° C.) | 1.0 | 0.3 | 0.1 | NA | NA | NA |

*NA: The measurement was impossible.

The crystallized glass in Tables 1 and 2 were made as follows. Raw materials were mixed so as to obtain the composition in each of the examples and comparisons, which was later put in a platinum crucible and then melted at 1580° C. for 20 hours. The melted glass was flowed to a carbon plate and then a glass plate with a thickness of 4 mm was formed by a roll. Thereafter, the glass plate was gradually cooled to the room temperature.

Next, a nucleation process was performed to each glass plate at 780° C. for 2 hours, and then a crystallization was performed with the crystallization temperature in Tables I and II for one hour. Afterwards, the glass plate was cooled to the room temperature. Regarding the examples 2 and 5, a pressure of $1500 \times 10^5$ Pa was isotropically applied to the glass plates and the nucleation process was performed to the glass plates at 780° C. for 2 hours. Then, a thermal process was performed with the crystallization temperature in Tables I and II, and then the glass plates were cooled to the room temperature.

For each sample obtained above, whether the sample was transformed into the β-spodumene solid solution, the crystal grain size, whether gap or crack occurs at the grain boundary, the crystallinity, the thermal expansion coefficient, the thermal expansion hysteresis, the light transmittance at a wavelength of 400 nm, the temperature dependence of the refractive index, and the temperature dependence of the optical path length were evaluated.

As learned from Tables I and II, in each of the samples No. 1 ~No. 9 in the examples, the β-quartz solid solution or the β-eucryptite solid solution was precipitated and the crystal grain size was not more than 15 μm. No gap or crack presented at the grain boundary and the crystallinity was not less than 72 mass %. In addition, the thermal expansion coefficient of each sample was negatively greater than $-10 \times 10^7$/° C. and the thermal expansion hysteresis was not more than 3 ppm. Furthermore, the light transmittance was not less than 35%, the temperature dependence of the refractive index (dn/dT) was not more than $12 \times 10^{-6}$/° C., and the temperature dependence of the optical path length (dS/dT) was not more than $9 \times 10^{-6}$/° C.

In each of the samples in the comparisons No. 10 and No. 11, a crystal grain size was not less than 1.0 μm, the main crystal was transformed into the β-spodumene solid solution, and the thermal expansion coefficient was positive. In the comparison No. 12, the thermal expansion coefficient was greatly negative, the gap presented at the grain boundary, so that the hysteresis was great and the light transmittance was 0%. Furthermore, any one of the samples in the comparisons No. 10~No. 12 is opaque and therefore the temperature dependences of the refractive index and the optical path length were impossible to measure.

The transformation into the β-spodumene solid solution and the crystallinity was obtained by a well known X-ray diffraction method, and the occurrence of the gap or crack at the grain boundary was examined by using a scanning type electronic microscope. The thermal expansion coefficient and the hysteresis were measured by a dilatometer. Regarding the light transmittance, each sample with a thickness of 3 mm was prepared and a spectrometer is used to measure the light transmittance at a wavelength of 400 nm. To evaluate the temperature dependence of the refractive index, the temperature of each of the samples was varied and then its refractive index was measured. Additionally, to evaluate the temperature dependence of the optical path length, each of the samples was put on an optical path of an interference optical system using a wavelength within 1100~1700 nm. When varying the temperature of the sample, the temperature dependence of the optical path length was obtained from the observed interference patterns, among which the maximum value was used to evaluate the temperature dependence of the optical path length.

As described above, the crystallized glass of the invention has a thermal expansion coefficient negatively greater than $-10 \times 10^{-7}$/° C., and the hysteresis of the thermal expansion is not more than 10 ppm. Therefore, the crystallized glass of the invention is particularly suitable as a substrate material to compensate the temperature variation for the FBG or waveguide device used in the optical communication field.

In addition, the temperature dependence of the refractive index (dn/dT) can be suppressed not more than $13 \times 10^{-6}$/°

C., and the temperature dependence of the optical path length (dS/dT) can be suppressed not more than $10 \times 10^{-6}/°$C. Therefore, the crystallized glass of the invention is suitable as a waveguide layer material for the waveguide device, such as the AWG or PLC etc whose optical path length has to be kept constant.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What claimed is:

1. A crystallized glass, a β-quartz solid solution or a β-eucryptite solid solution being precipitated as a main crystal, wherein the crystallized glass has a crystallinity not less than 70 mass %, a crystal grain size not more than 0.5 μm, substantially no gap or crack presenting at boundaries of crystal grains, and wherein the crystallized glass also has a thermal expansion coefficient being negatively greater than $-10 \times 10^{-7}/°$ C. within a temperature range of $-40°$ C.$\sim 100°$ C., a hysteresis of the thermal expansion coefficient within the temperature range being not more than 10 ppm, and a temperature dependence of refractive index being not more than $13 \times 10^{-6}/°$ C.

2. The crystallized glass of claim 1, wherein the crystallized glass contains 60~72% of $SiO_2$, 18~26% of $Al_2O_3$, 3.8~6.5% of $Li_2O$, 1.5~4.1 of $ZrO_2$, and 0~10% of $P_2O_5$ in mass %.

3. The crystallized glass of claim 1, wherein a light transmittance of the crystallized glass with a thickness of 3 mm and using a wavelength of 400~1700 nm is not less than 20%.

4. The crystallized glass of claim 1, wherein a temperature dependence of an optical path length of the crystallized glass is not more than $10 \times 10^{-6}/°$ C.

5. The crystallized glass of claim 1, wherein a temperature dependence of an optical path length of the crystallized glass is not more than $5 \times 10^{-6}/°$ C.

6. An optical device, comprising a crystallized glass, wherein a β-quartz solid solution or a β-eucryptite solid solution being deposited as a main crystal, wherein the crystallized glass has a crystallinity not less than 70 mass %, a crystal grain size not more than 0.5 μm, substantially no gap or crack presenting at boundaries of crystal grains, and wherein the crystallized glass also has a thermal expansion coefficient being negatively greater than $-10 \times 10^{-7}/°$ C. within a temperature range of $-40°$ C.$\sim 100°$ C., a hysteresis of the thermal expansion coefficient within the temperature range being not more than 10 ppm, and a temperature dependence of refractive index being not more than $13 \times 10^{-6}/°$ C.

7. The optical device of claim 6, wherein the crystallized glass contains 60~72% of $SiO_2$, 18~26% of $Al_2O_3$, 3.8~6.5% of $Li_2O$, 1.5~4.1 of $ZrO_2$, and 0~10% of $P_2O_5$ in mass %.

8. The optical device of claim 6, wherein a light transmittance of the crystallized glass with a thickness of 3 mm and using a wavelength of 400~1700 nm is not less than 20%.

9. The optical device of claim 6, wherein a temperature dependence of an optical path length of the crystallized glass is not more than $10 \times 10^{-6}/°$ C.

10. The optical device of claim 6, wherein a temperature dependence of an optical path length of the crystallized glass is not more than $5 \times 10^{-6}/°$ C.

* * * * *